United States Patent [19]

Vielmo et al.

[11] Patent Number: 4,974,996
[45] Date of Patent: Dec. 4, 1990

[54] PROCESS AND DEVICE FOR THE PRECISION POSITIONING OF BODIES ON FIXED STRUCTURES UNDER HIGH DEPTH WATERS

[75] Inventors: Paolo Vielmo, Padova; Attilio Brighenti, Venice, both of Italy

[73] Assignee: Tecnomare SpA, Venice, Italy

[21] Appl. No.: 512,009

[22] Filed: Apr. 12, 1990

Related U.S. Application Data

[63] Continuation of Ser. No. 269,628, Nov. 10, 1988, abandoned.

[30] Foreign Application Priority Data

Nov. 13, 1987 [IT] Italy .............................. 22627 A/87

[51] Int. Cl.[5] ............................................. B63C 11/52
[52] U.S. Cl. ................................... 405/188; 405/191; 901/2; 166/341
[58] Field of Search ............... 405/185, 188, 190, 191; 901/2; 414/730; 166/338, 341

[56] References Cited

U.S. PATENT DOCUMENTS

| 3,451,224 | 6/1969 | Colechia et al. ...................... 405/190 |
| 3,717,000 | 2/1973 | Rothwell, Jr. ...................... 405/190 |
| 4,030,434 | 6/1977 | Pedlas et al. ...................... 405/191 X |
| 4,402,773 | 9/1983 | Morrill ........................ 285/348 X |
| 4,460,295 | 7/1984 | Migiarese-Caputi et al. ... 405/190 X |
| 4,643,616 | 2/1987 | Castel et al. ......................... 405/191 |
| 4,674,915 | 6/1987 | Shatto, Jr. ............................ 405/191 |
| 4,676,696 | 6/1987 | Laursen ........................... 166/338 X |
| 4,687,062 | 8/1987 | Beghetto et al. .............. 405/227 X |

Primary Examiner—Dennis L. Taylor
Assistant Examiner—Arlen L. Olsen
Attorney, Agent, or Firm—Hedman, Gibson, Costigan, Hoare

[57] ABSTRACT

Device for the precision-positioning of bodies on fixed structures on the sea bottom in high-depth waters. The device comprises a fixed structure and an articulated structure. One end of the articulated structure is fastened to the body to be positioned, and the other end is engaged inside a reference seat of the fixed structure on the sea bottom. The precision-positioning of the body is carried out by linearly and/or angularly displacing the articulated structure with respect to the fixed structure.

12 Claims, 5 Drawing Sheets

PROCESS AND DEVICE FOR THE PRECISION POSITIONING OF BODIES ON FIXED STRUCTURES UNDER HIGH DEPTH WATERS

CROSS-REFERENCE TO RELATED APPLICATION

This application is a continuation of Ser. No. 07/269,628, filed on Nov. 10, 1988, now abandoned.

FIELD OF THE INVENTION

The present invention relates to a process and a device for the precision positioning of heavy and delicate bodies onto seafloors. For example, structures, portions of facilities, or instrumental systems destined for the exploitation of deep-sea bottoms must be lowered from the sea surface by means of cranes (or similar devices) to preexisting bodies or reference points on the sea bottom in a fixed relative position. The present invention can be advantageously used for any high-depth underwater installations during both installation and modification and maintenance procedures. In order to demonstrate its characteristics and advantages, reference will be made herein to an application of exploiting offshore hydrocarbon fields. This is offered solely for exemplary purposes and the invention is not in any way limited to such an application.

High depths make human intervention (skin-divers or divers) difficult on the sea-bottom, therefore all operations have to be carried out with remote diving means and controls.

The difficulty of such operations arises from many technical and environmental factors, the most significant of which are reported hereinunder.

- the distance of the reference point (the laying point) from the body to be positioned relative to the sea surface;
- the need for having available reliable instrumental means for the determination of the relative position of the body to be positioned relative to the laying point;
- the frequency and force of currents and waves which can alter the position of the hanging body relative to the critical vertical position;
- the movements of the vessels on the sea surface controlling the positioning of the body to be installed, which generate dynamic stresses in the hanging system (the hanging body plus the rope, chain or manoeuvering rod);
- the position of the surface vessel controlling the positioning which necessarily is not over the critically vertical point where the hanging body has to be positioned.

These factors are particularly critical in the field of offshore engineering in deep waters, and specifically in the prospecting and exploitation of hydrocarbon fields in deep waters.

In such an activity, apparatuses and structures have to be positioned on sea bottoms, with delicacy, and precision. These can be, for example:

portions of modular installations, such as instrument and control components or units on undersea templates for operating the production of undersea fields; such operations can be, for example, the extraction of hydrocarbons and the re-injection of liquids or gases by means of undersea facilities;

specific equipment designed for specific operations, such as, e.g., the connecting and disconnecting of hydraulic or electrical connections, removal and replacemnt of portions of facilities for maintenance and repair purposes, and the accomplishing of structural connections;

structural parts in a building process to be carried out on sea-bottom, such as, e.g., the foundation poles inside the respective guides, which must be driven into the sea-bottom;

drills and risers, with their guides;

equipment for recovering and positioning instrumental detection systems on a specific site.

DESCRIPTION OF THE PRIOR ART

In the prior art, the positioning of structures or bodies on deep-water bottoms is carried out according to a variety of techniques, all of which suffer from various drawbacks.

One of these techniques presently applied for depths not greater than 400 meters, is based on the use of guide ropes fastened to the sea bottom around the laying point. Such guide ropes are connected to the structure which is installed on the sea bottom and are tensioned from the surface. Along these guides the body to be installed is slid by means of sliding-link means such as guide rings or sleeves—with said body to be installed being vertically supported from the sea surface. The ropes can guide the body up for engagement inside fixed reference structures, such as guide rods, or into a "seat", wherein it is laid with very precise tolerance.

Such an approach, very simple and reliable from a conceptual viewpoint is not free from drawbacks. These become more and more considerable with increasing depth.

One of the drawbacks is that the problem of positioning of the body is simply transferred to the positioning of the ends of the guide ropes. This requires the intervention of a means on the sea-bottom to carry out at least the first connection thereof.

Another drawback is due to using complex systems of tensioning the guide ropes to maintain them in a vertical position, correctly spaced apart from one another, in the presence of currents and movement of the surface vessel which is, in turn, subject to the action of waves. Such tensioning is transmitted with negative consequences to the structure on the bottom of the sea. The structure therefore must be so designed as to be able to withstand these forces.

Another more recent positioning technique not yet fully developed but which is the subject matter of a large number of literature references, does not resort to the guide ropes, but carries out the positioning of bodies on sea bottom by means of movements of the surface vessel or of devices with which it is equipped. These devices are for lifting the bodies to be positioned and for compensating for the relative distance between the body to be positioned and its seat on the structure on sea bottom. Such a technique requires sophisticated instrumentation systems (e.g., hydroacoustical and/or optical systems), for measuring the distance (according to the three Cartesian coordinates) and the rotations between the hanging body and the seat inside which it has be positioned. Furthermore, the necessity arises for cumbersome invitation structures (e.g., trueing cones) to be prearranged for guiding the body into its seat during the end steps of the laying.

Such structures must perform a double function: they must compensate for the unavoidable inaccuracies in the positioning when acting on the sea surface by moving the surface vessel supporting the hanging structure; and they should protect the surrounding facility portions from possible impacts caused by the body which is in its final laying step. A template is prearranged in order to house a plurality of facilities and pieces of equipment.

The size of the invitation and protection structure is therefore proportional to a possible inaccuracy in positioning. The disadvantages inherent in such a positioning technique consist of the inaccuracies of positioning. These are derived from the motion of the surface vessel, in the operating times necessary to attain an adequate positioning, and in the damping of the dynamic phenomena, without endangering the invitation structures.

Such a positioning technique is used for positioning single pieces of equipment, but never with templates having a plurality of positions.

A more recent positioning technique provides for an active positioning—at least on the horizontal plane—by propulsion. Such a technique makes the dynamic positioning of the hanging body to be actively controlled by means of the propulsion system by measuring the relative position of the said hanging body to the laying seat to achieve the desired accuracy in positioning.

In general, the propulsor means are installed on a structure integral with the hook or the coupling which supports the hanging body and are actuated by means of a system fed with power and controlled from the sea surface. According to a simpler form of practical embodiment, such a propulsor system comprises a high-pressure water jet fed from the sea surface by means of a metal duct, and orientated by rotating the same duct. According to more complex variants, such a system is comprised by a plurality of electrohydraulic propulsor means controlled from the surface by means of an umbilical cable and an underwater hydraulic control unit.

The above described techniques only make adjustments in the horizontal plane and rotating in the vertical axis. Changes in the vertical direction are controlled by means of the supporting rope (or similar means). The rotations in the horizontal axes are controlled passively by means of suitable distribution of the weights relative to the hanging-up point.

More sophisticated forms of practical embodiment were proposed which comprise controlling the vertical position of the body to be laid on the sea bottom by means of floating bodies—possible with a variable thrust—and/or propulsor means; in this way the carrier of the body to be positioned becomes a remote-controlled self-propeled vehicle.

When the system is equipped with a propulsor means it demonstrates the advantage of considerable flexibility of use regarding precision positioning of the surface vessel relative to the reference point on sea bottom. However, it also requires equipment and structures for fine positioning in the end laying step, and shows considerable functional and operating complexity.

The final precision positioning of hanging bodies having a considerable mass requires controlling the vertical movement by means of the hanging-up rope. It further requires contrivances and devices to prevent excessive impact stresses at the moment of contact due to unavoidable motions caused by the oscillations of the surface carrier subject to the waves. For that purpose, suitable means for dampening and compensating such oscillations are adopted.

In fact, one should bear in mind that the necessary apparatuses for the exploitation of submarine fields which have to be positioned on sea bottom, for example, field re-injection apparatuses, connections between the pipeline and the borehead, valves and control instruments, all have considerable overall dimensions and weights, which can exceed ten tons. Therefore, it is of vital importance to prevent these apparatuses—during their positioning—from colliding, or interfering with the other components of the facility which have already been assembled on the same template, or reference structure, on sea bottom.

SUMMARY OF THE INVENTION

The device and process for the precision-positioning on deep-sea bottoms according to the present invention overcomes the aforementioned drawbacks and limitations which affect the posititoning systems of the prior art.

The device according to the present invention comprises two units operating in cooperation. The first unit comprises a fixed reference structure installed on the sea bottom—commonly denominated as a template. The second unit comprises a variable-geometry structure, or articulated arm, which at one of its ends is connected with the structure by a hook structure or the like which supports the body during the sinking and positioning operations, and at its other end enters into engagement with a reference seat provided on the template, after a rough positioning step carried out by means of the support rope. When the engagement has been carried out, the articulated arm guides the precision positioning of the body until the body reaches its seat.

According to the present invention, the template is used as the reference element in the fine positioning: i.e., as a true "template", according to the meaning of this term in other branches of the mechanical and building industry.

BRIEF DESCRIPTION OF THE DRAWINGS

FIG. 3a1 depicts the first step of the locking system locking the articulated arm into the reference seat of the fixed structure.

FIG. 3a2 is an enlarged view of FIG. 3a1.

FIG. 3b1 depicts a next step of the locking system locking the articulated arm into the reference seat of the fixed structure.

FIG. 3b2 is an enlarged view of FIG. 3b1.

FIG. 3c1 depicts another step of the locking system locking the articulated arm into the reference seat of the fixed structure.

FIG. 3c2 is an enlarged view of FIG. 3c1.

The following preferred embodiment as exemplified by the drawings is illustrative of the invention and is not intended to limit the invention as encompassed by the claims of the application.

DESCRIPTION OF THE PREFERRED EMBODIMENT

Figure 1A:
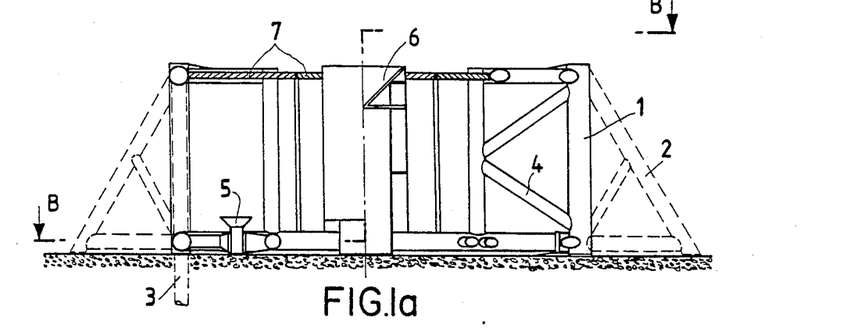
FIG. 1a is a sectional view of the fixed structure of the present invention.
Figure 1B:
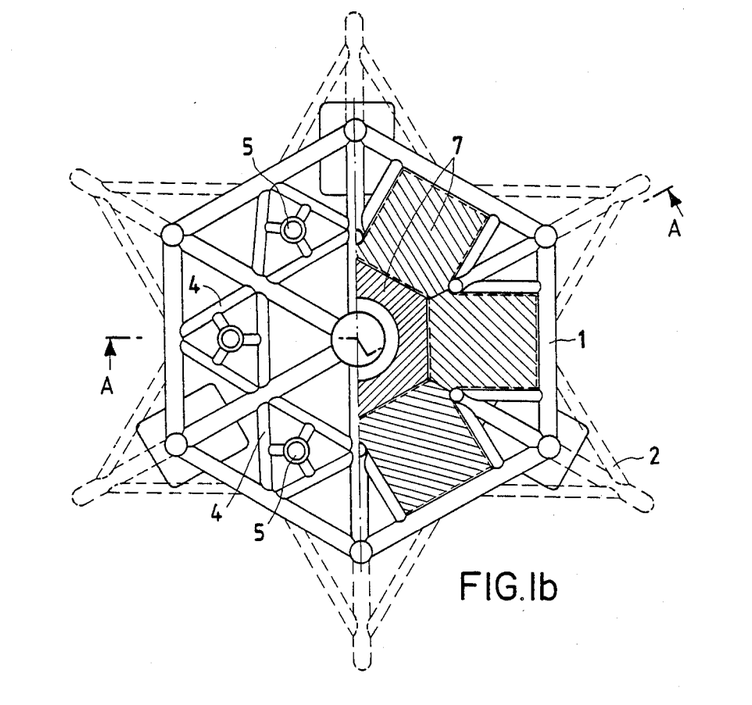
FIG. 1b, is a plan view of the fixed structure of the present invention.

In FIGS. 1a and 1b, the fixed structure, viz. the template, is shown in plan and in sectional view.

It comprises a main frame including a trestlework of tubular elements or of structural iron 1 which is analogous to other templates already known from the prior art and of polygonal, preferably regular shape provided with bracings 2, which protect it from accidental impacts of anchors or other bodies sunk to the bottom and against getting entangled with trawl-nets and the like and which expand its support base on the sea bottom.

The trestlework-frame 1 is secured in position by means of foundation poles 3 driven into the sea-bottom inside of which frames 4 are provided. These frams contain seats 5 which comprise the positioning sites for the apparatuses installed on the sea bottom.

Such seats 4 are preferably arranged in a regular and symmetrical way around the centre of the polygon. The template also contains preferably at the centre of the polygonal trestlework a reference seat 6 of conical shape. The vertex of this reference seat is directed downwards. Inside this seat the variable-geometry structure, or articulated arm is inserted in order to subsequently carry out the precision-positioning based on the reference structure 6.

According to a preferred form of practical embodiment, the reference seat 6 is positioned at a higher level than the seats 5 which are served by the articulated arm.

The covering elements 7 are placed on the upper plane of the frame 1 after the relevant apparatus is laid inside one or more of the seats 5 to act as protection against fortuitous events.

Figure 2:
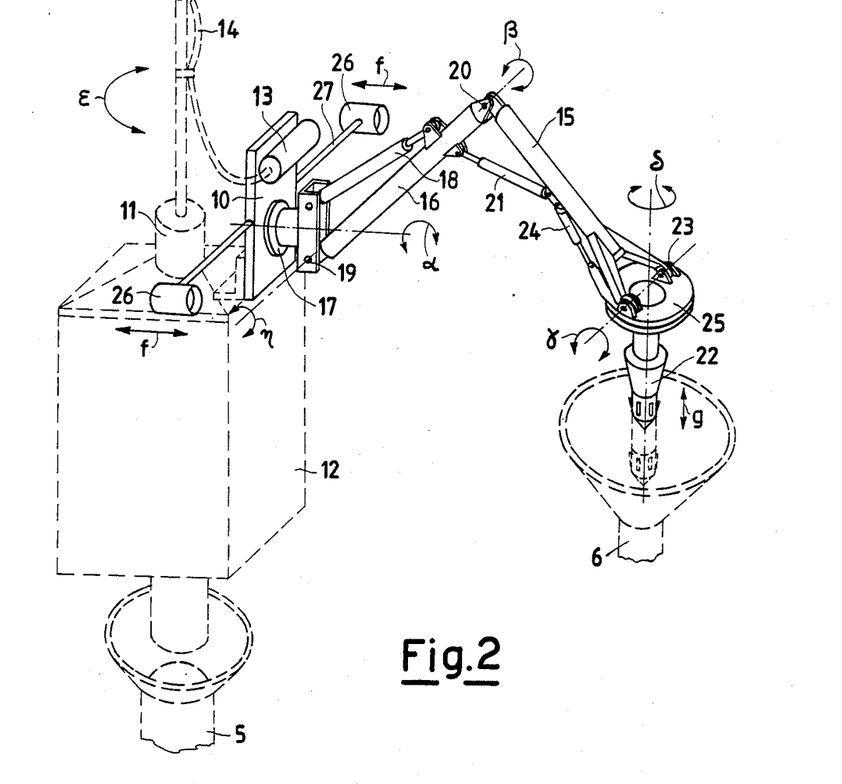
FIG. 2 is an orthogonal representation of the variable geometry structure (the articulated arm) of the present invention.

A typical form of practical embodiment of the variable-geometry structure or articulated arm is depicted in FIG. 2.

The structure bears at one of its ends an end support element, or interface flange 10 made integral with the hooking tool or device 11 for supporting the body 12 positioned inside the seat 5.

The members are installed on the interface flange or support 10 and are necessary for feeding power to the actuators of the variable-geometry structure for controlling it, as well as for the connection 13 of the umbilical cable 14 which makes the whole system to be remote-controlled from the sea surface.

The structure preferably has an articulated-arm structure comprising longitudinal elements 15 and 16 hinged at their ends with the relative rotations of each element to the other controlled by means of actuators.

Such actuators are shown in FIG. 2 as hydraulic cylinders but can be mechanical devices of roll-rack type or other equivalent devices for carrying out extension and retraction movements.

The rotations $\alpha$ of the articulated arm are effected by the horizontal-axis rotatable thrust-bearing 17 whose rotation drive means is not shown in the figure, but which allows a certain angular rotation according to $\alpha$.

The horizontal-axis thrust bearing 17 has a hinge 19 in its movable portion so that the element 16 can move in a vertical plane, controlled by the actuator 18. This vertical plane can further rotate within a certain angle.

The second element 15 articulates relative to the first element through the hinge 20, the opening and closing of which is controlled by the hydraulic cylinder 21 according to the rotation $\beta$. Said second element 15 has at its opposite end an articulated system having two degrees of freedom, which connects it to an end element of long shape which is a fastening device. This device makes the physical connection with the seat 6. It will be disclosed hereinunder with reference to FIG. 3.

The system of articulation having two degrees of freedom comprises a hinge 23, the rotation $\gamma$ which is controlled by the hydraulic cylinder 24 and a vertical-axis thrust bearing 25 which can rotate on the azimuthal plane according to the rotation $\delta$, due to a rotation drive means which is not in the figure for the sake of simplicity.

The rotations $\delta$ and $\epsilon$ in the aximuthal plane are controlled by the propulsor means (either of jet-type or of propeller type) 26 which can supply a thrust according to the "f" directions.

Said propulsors 26 are installed on the support 10 by means of arms 27 which allow the propulsors 26 to apply an azimuthal torsional torque.

When the extendible arm is only supported by the hooking device 11, and must still enter into engagement with the seat 6, the azimuthal torsional arm causes the rotation according to $\epsilon$ around the axis of the hooking device.

When, on the contrary, the element 22 is engaged inside 6, the azimuthal torsional moment can be generated by the provided rotation control drive and assisted by the propulsors 26 which cause the rotation according to $\delta$. From the analysis of the kinematic structure of the articulated arm, it is immediately evident that the position in space of the element 22 relative to the support 10 is determined by the rotations $\alpha$, $\beta$, $\gamma$, $\delta$ and $\eta$. These are determined by the storke of the actuators which control said rotations. On the contrary, the rotation $\epsilon$ which is determined by the propulsors 26 does not change the above said relative position between 10 and 22 but shifts the whole articulated arm.

The extent of the rotations $\alpha$, $\beta$, $\gamma$, $\delta$ and $\eta$ between the various elements of the arm is controlled by a system of enslaving the acutators to the value of the rotation angle. This technique is within the knowledge of the prior art in the field of remote control.

At the other end of the articulated arm, the fastening device 22 is hinged. This is disclosed in greater detail referring to FIGS. 3a1, 3a2, 3b1, 3b2, 3c1, and 3cwhich show a typical form of practical embodiment thereof for illustrative and non-limitative purposes.

Figures 3A, 3A, 3B, 3B, 3C, 3C:
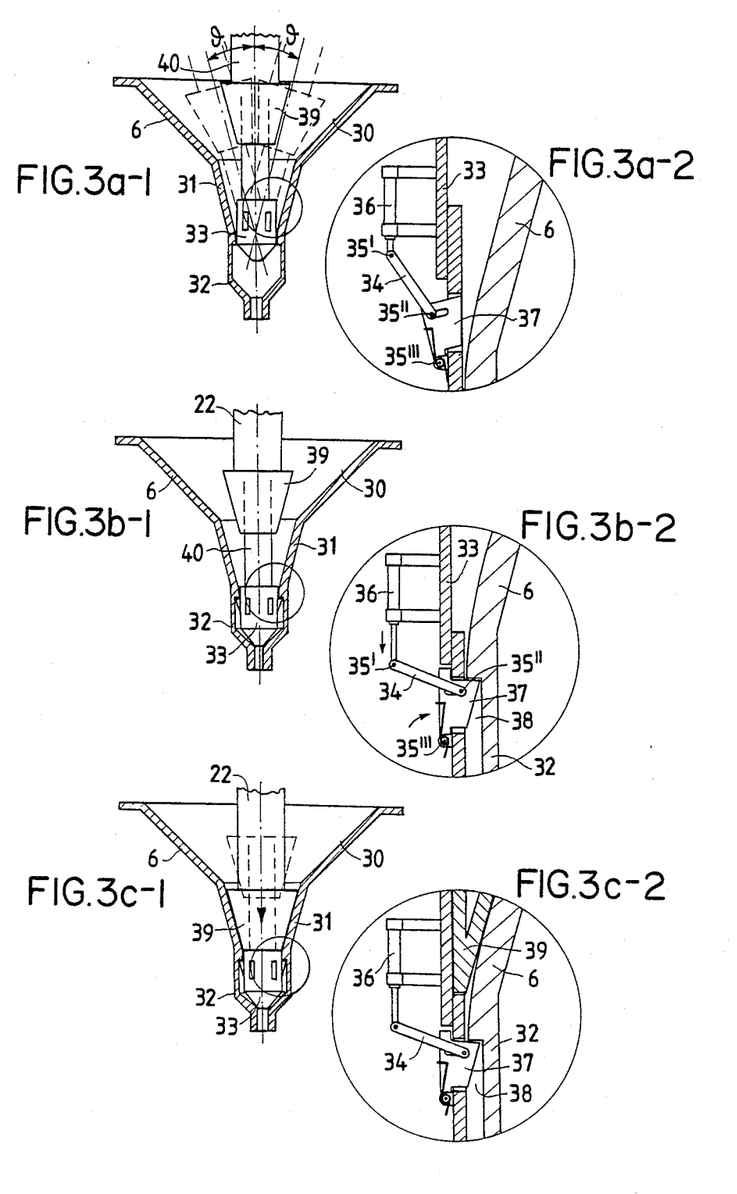

The reference seat 6 preferably has an outline comprising from top downwards a sequence of two cone frustums 30 and 31 with decreasing conicalness and having an end cylindrical seat 32 which matches the lower end portion 33 of the constraint device 22 which contains a locking device. Said device can comprise, e.g., of articulated arms 34, hinged in correspondence with hinges 35', 35'', 35''', and actuated by hydraulic jacks 36 which enable the ratchets 37 to engage inside hollows 38 which are provided inside the seat 32 according to the magnified details of FIGS. 3a2, 3b2, and 3c2.

In these figures, three configurations of the locking system are shown, wherein FIGS. 3a1 and 3a2 corresponds to the step of engagement of 22 into 6, according to the direction g of FIG. 2. FIGS. 3b1 and 3b2 corresponds to the engagement and actuation of the ratchets 37 inside the hollow 38. Due to the internal shape and dimensions of the seat in which the element 33 is engaged, the ratchets 37 also engage in angle $\nu$ offset to the body 33 relative to vertical. In the particular form of embodiment depicted in FIGS. 3a1, 3a2, 3b1, 3b2, 3c1, and 3c2, the pivot of the hinge 35" is positioned inside a short slot provided in the ratchet 37.

The element 22 is further provided with an element 39 of cone frustum shape—with its flaring being consistent with the portion 31 of the reference seat 6. This is mounted on a sliding sleeve 40 which, when the engagement has occurred, keeps the cone-frustum element 39 secure with the seat 31. This is shown in FIGS. 3c1 and 3c2. It is then blocked, thus providing a constraint of absolute safety. Under such conditions, the axis of the body 22 assumes a vertical orientation. The means for controlling the position of the sliding sleeve are not shown in the figures, but such a control can be carried out by means of a hydraulic control means analogous to the previous ones.

The fastening device in this configuration is capable of realizing a complete fastening of the end 22 to the structure fixed on sea bottom.

Under such conditions, it is possible—by acting on the articulations and the moving members of the variable-geometry structure—to control the position in space of the support 10. This is connected with the hooking device 11 of the body 12 to be positioned, and therefore it precisely guides this element to reach its desired position inside the seat 5.

Figure 4:
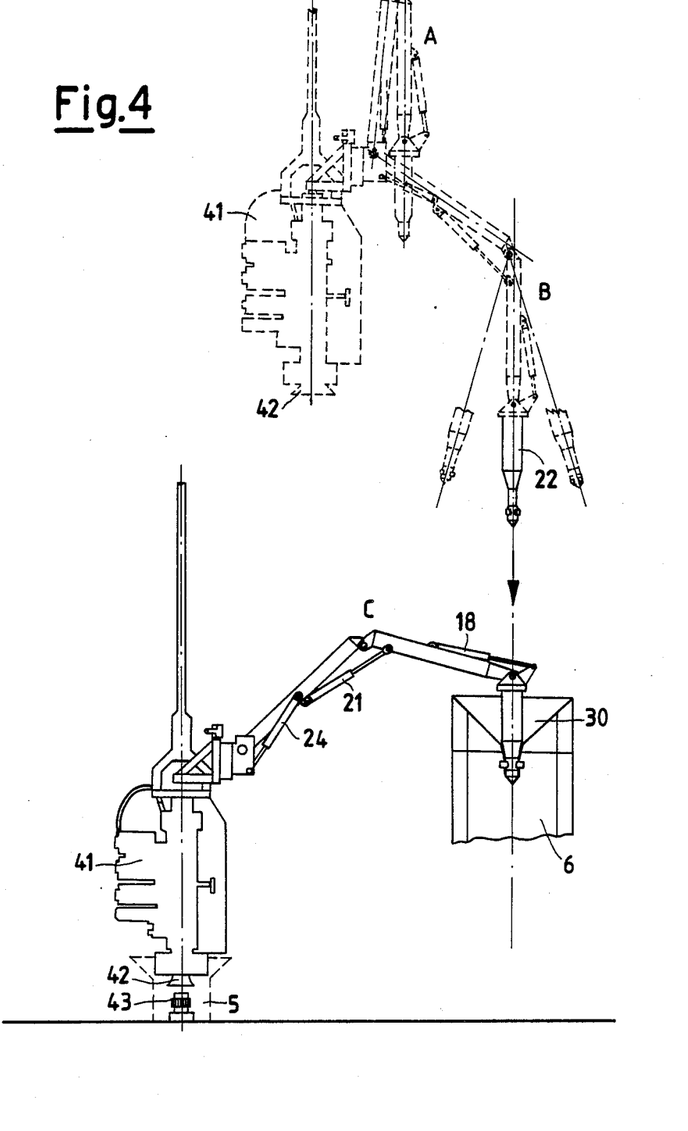
FIG. 4 depicts the positioning procedure of the device of the invention.

The positioning device according to the present invention makes the positioning a very simple and efficient procedure. Such a procedure is explained by referring to FIG. 4. FIG. 4 depicts the procedure of laying a complete borehead apparatus 41 for an undersea hydrocarbon field, installed with precision, with its bottom connection 42 connecting with the fitting 43 which is situated inside the seat 5.

In the initial step of the procedure, the whole articulated-arm device is preferably kept folded in a configuration with minimum overall dimensions, as indicated by the reference letter "A". This is to allow it to be easily handled on board of the surface vessel and for it to pass through the hauling and launching openings which are commonly denominated as the "moon pool".

The step of approaching or "rough" positioning, is carried out with the rope, or supporting means.

As it has been hereinabove already stated, the variable-geometry device is equipped with a group of propulsors 26, which make possible the orientation on the aximuthal plan the whole hanging unit. This is also accomplished when said hanging unit is supported by a rope, or another means not endowed with a substantial torsional rigidity. Such a control is very useful in all procedural steps. This propulsor group is enslaved to a reference system, for example, a magnetic compass, or a gyrocompass, to constantly maintain the orientation of the hanging unit in a defined azimuthal position.

Before approaching the sea-bottom, the variable-geometry structure is preferably opened and extended to the "B" position to place the hooking device 22 at the level lower than the lowest level of the lower end 42 of the hanging body as shown by the borehead 41.

In this way, any accidental impacts of the heavy hanging element against the fixed structure can be prevented before the hooking device 22 is first engaged with the seat 6.

It is recommended that the articulated arm and the hooking device 22 be made from materials endowed with a high ratio of mechanical strength to weight, e.g., light alloys, titanium, composite materials, and/or incorporating inside floating bodies. In this way their weight in water becomes negligible or zero. The result of this is that the barycentre of the whole hanging unit shows a negligible displacement when the articulated arm is extended.

The rough positioning step ends when the suspended unit is at a distance from the template so the seat 6 is within reach of the articulated arm and, in particular, of its hooking device 22.

The hooking device 22 is moved near the template as the hanging load oscillates to keep it on the vertical of seat 6 and above its invitation cone 30 by actuating the articulated arm.

When it is in a favourable position, the centering device is lowered while simultaneously releasing the supporting rope It is inserted into the seat 32 which makes it slide along the walls of the two conical sets 30 and 31 which comprise the centering cone.

The locking actions of the constraint inside the seat 6 are then carried out according to the steps shown in FIGS. 3a, 3b and 3c.

When the articulated arm has stably fastened its end 22 inside the seat 6 according to the FIG. 3c, the step of fine positioning the hanging body is started. The constraint accomplished by the variable-geometry structure can be capable of supporting the total weight of the body to be positioned, or, it can support the weight of this latter which is not supported by the lifting rope (or rod). In this way, it is possible to eliminate, or substantially reduce the vertical movements of the hanging body induced by the oscillations of the surface vessel the effect of the waves, and which also appear in the devices which compensate for the changes in tension of the lifting rope. Therefore, any stresses which occur during final fine positioning on the seat 5 can be substantially reduced.

The operation of fine positioning is carried out by actuating the articulated arm which, now fixed by the fastening means 22, compensates with the rotations $\alpha$, $\beta$, $\gamma$ and $\delta$. These movements are controlled by the dedicated actuators and can be made easier by the propulsors 26. These are used for the offset positioning of the body 41, so that its lower coupling portion 42 is vertical with the seat 5 and the nozzle 43.

The final release is carried out by means of the articulated arm alone or in combination with the action of the hanging-up rope.

The hereinabove disclosed operations of positioning are carried out under a remote control of optical, hydroacoustical or mechanical elements, with measurement systems comprising instruments known from the prior art.

One should further bear in mind that knowing the geometry of the articulated arm and the measurement of its acutators extension makes possible the rotations $\alpha$, $\beta$, $\gamma$ and $\delta$ to be measured. In this way, the exact position of 42 relative to 6 is known. The requirements for remote instrumental control are very simple compared to procedures of positioning the prior art.

When the positioning is completed, the device can be disconnected from the body to be positioned 12, and the fastening device 22 disengaged from the seat 6 and recovered to the sea surface by means of the supporting rope.

The variable-geometry structure must—as it appears from this disclosure—be essentially capable of determining with precision the relative position between the support 10 and the fastening element 22 of constraint to the template, winning the opposing forces.

Figure 5:
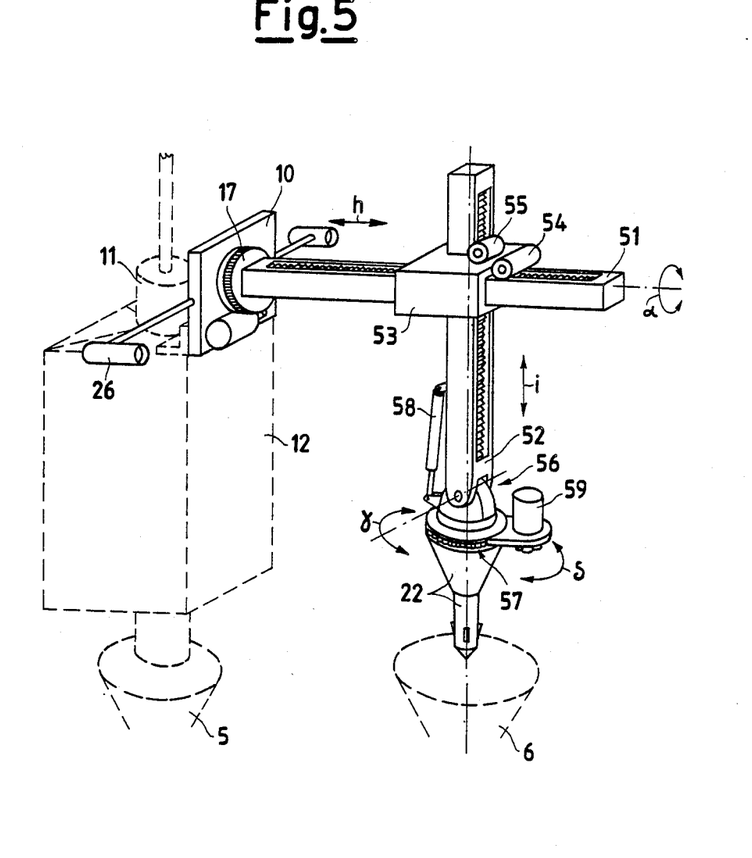
FIG. 5 is an orthogonal representation of another embodiment of the variable geometry structure.

A different form of practical embodiment of the variable-geometry structure is now disclosed with reference to FIG. 5.

The elements of the practical embodiment depicted in FIG. 5 share with the element of FIG. 3 as indicated by the same reference numerals.

The variable-geometry structure of FIG. 6 comprises two rods 51 and 52 which are positioned according to substantially mutually perpendicular axes and movable by means of prismatic couplings on a connection block 53. This also bears the devices 54 and 55 which move the rod 52 relative to the rod 51.

These devices can be, for exemplifying purposes, pinion-rack systems which are driven by remote-controlled electrical or hydraulic motors.

In particular, the device 54 moves the block 53 and consequently the rod 52 relative to the rod 51 into the direction h. This is accomplished while the device 55 moves the rod 52 relative to the block 53 into the direction i.

The rod 51 is attached to the support 10 by means of the horizontal-axis thrust bearing 17, which is motor-driven by means of a drive device 55. The drive device comprises gear wheels driven by an electrical or hydraulic motor which makes the rotation "$\alpha$" (such an acutator means was not shown in FIGS. 3a, 3b or 3c for the sake of simplicity).

The lower end of the rod 52 is connected to the fastening device 22 by means of a cardan joint 56 and a vertical-axis thrust bearing 57.

The rotations "$\gamma$" and "$\delta$" of the cardan joint can be remote-controlled by means of actuators 58 and 59.

The propulsors 26 control the orientation in the azimuthal plane.

For the foregoing reasons, the improvements of the device according to the present invention provide a more simple and reliable precision-positioning procedure than that of the prior art.

The extension of the variable-geometry structure with the configuration of the template installed on the sea bottom particularly regarding the reference seat 6 make the insertion of the constraint device 22 inside its seat possible. This step is prior to the final positioning step and accomplished without complicated passive guide ropes or such systems which require active control of the propulsors, or the systems which require the positioning of the hanging-up rope.

The final step of precision-positioning is accomplished by the device according to the present invention simply and with a high degree of accuracy, independently from the depth of the sea bottom.

The depth at which the prior art devices and processes operate, on the other hand, is very critical. Such a depth may easily become prohibitive for the processes and devices known from the prior art.

A further advantage of the present invention is that the variable-geometry device requires a minimum of structural and geometrical specialization from the template which receives the body to be positioned. That is, extremely simple structures of guides and end centering into the installation seat are required.

A very considerable improvement attained by the present invention is seen in that the precision-positioning is carried out with the variable-geometry device with precise trajectories always determined and azimuthal and zenithal orientations always controlled. It is capable of easily positioning bodies not designed for vertical-axis seats, and with any kind of positioning inside the space defined by the template.

Such advantages are necessary for offshore technology on high-depth sea-bottoms. This is because maximum freedom occurs in the positioning of the bodies which comprise the sea bottom production facility, particularly when such a facility is complex and delicate, like those which are used for exploiting the high-depth hydrocarbon fields.

In case of particularly complex facilities, the template can have a plurality of reference seats 6, instead of one single reference seat. In such a template, besides the consequent increase in the number of positions 5 which can be served by the variable-geometry device, the possibility also exists of a simultaneous use of a plurality of positioning devices on the same template, which can operate either independently, or in mutual cooperation.

We claim:

1. A method of precisely positioning a body onto a fixed structure located on the sea floor in high depth waters wherein said fixed structure comprises at least one reference seat means and at least one positioning seat means and wherein the body is lowered toward the sea floor by hanging elements, and the positioning comprises the following steps:
   (a) attaching a hanging element to a support means on the body wherein said support means comprises an articulated arm means extending therefrom which includes an attaching means;
   (b) lowering the body by the hanging elements so that the reference seat means is within the reach of the articulated arm means at an end distal the body;
   (c) manipulating said distal end of said articulated arm means;
   (d) attaching and fixing the end of said articulated arm means in the reference seat with said attaching means; and
   (e) positioning the body by manipulating said articulated arm means fixed to the reference seat wherein the body includes a bottom connecting means so that said bottom connecting means engages with the positioning seat.

2. The method of claim 1 wherein the precise positioning of the body includes combining the lowering of the body by the hanging elements and manipulating said articulated arm.

3. A device for precisely positioning a body onto a fixed structure located on the sea floor in high depth waters, wherein the body is lowered towards the sea floor by hanging elements, and the device comprises:
   (a) an arm which can articulate having a first end and a second end wherein said first end is attached to a support means integral with the body and said second end includes an attaching means for connecting to the fixed structure;
   (b) a plurality of seats attached to the fixed structure wherein at least one of said seats is a reference seat comprising means for receiving said attaching means of said second end of said articulated arm, wherein said means for receiving further includes a constraining means for fixedly securing said attaching means, wherein the remainder of said plurality of seats are positioning seats for the body and each seat has means for independently and separately receiving said body in each of said seats.

4. The device of claim 3 wherein said articulated arm comprises a first and a second longitudinal elements, wherein said first longitudinal element is proximate to the body and said second longitudinal element is proximate to said connecting means and wherein each of said longitudinal elements are connected to each other at one of their ends by a first hinge connection and moveable around the axis of said first hinge connection and wherein each of said longitudinal elements have an articulation having two degrees of freedom at each of their respective other ends.

5. The device of claim 4 wherein said first and said second longitudinal elements each include at their respective opposite ends a horizontal axis thrust bearing for providing each of said longitudinal elements with rotational movement and a second hinge wherein said second hinge of said first longitudinal element provides movement in the vertical plane and said second hinge of said second longitudinal element provides movement of said attaching means around the axis of said second hinge wherein horizontal axis thrust bearing and said second hinge of each of said longitudinal elements provide said movement having two degrees of freedom.

6. The device of claim 3 wherein said reference seat comprises a conical shape having a downwardly directed vertex.

7. The device of claim 6 wherein said conical shape of said reference seat further comprises a shape of decreasing conicalness in the downward direction.

8. The device of claim 7 wherein said attachment means includes an expanding linking means and said reference seat further comprises at least one hollow for receiving said expanding linking means of said attaching means.

9. The device of claim 3 wherein said attaching means comprises an end portion having at least one expandible linking means and said reference seat comprises at least one hollow for receiving said expandible linking means of said attaching means.

10. The device of claim 3, 4, 5, 6, 7, 8 or 9 wherein said attaching means further comprises a sleeve and a cone frustum element slidingly attached on said sleeve wherein said cone frustum element engages with at least a portion of said reference seat and wherein said engagement of said cone frustum element occurs in the lowermost portion of said sleeve.

11. The device of claim 3 wherein said articulated arm comprises a first rod and a second rod connected to each other by a connection block means and positioned substantially perpendicular to each other, wherein said first rod is connected to said support means by a horizontal axis motor driven thrust bearing for providing horizontal movement, and said second rod is connected to said attaching means by a hinge joint.

12. The device according to claims 3 or 11 wherein the body comprises propulsors for providing torsional torque for azimuthal orientation of the device.

* * * * *